United States Patent
Jenkins et al.

(10) Patent No.: US 6,804,091 B2
(45) Date of Patent: Oct. 12, 2004

(54) SWITCHING REGULATOR TRANSIENT SUPPRESSOR

(75) Inventors: Daniel E. Jenkins, Bastrop, TX (US); Brent A. McDonald, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 270 days.

(21) Appl. No.: 10/156,913

(22) Filed: May 29, 2002

(65) Prior Publication Data

US 2003/0223159 A1 Dec. 4, 2003

(51) Int. Cl.[7] ............................................. H02H 7/00
(52) U.S. Cl. ..................................... 361/18; 361/91.1
(58) Field of Search ..................... 361/18, 54, 91.1, 361/91.5; 323/223, 231, 282, 284, 344, 345; 363/74

(56) References Cited

U.S. PATENT DOCUMENTS

| | | | |
|---|---|---|---|
| 3,970,871 A | 7/1976 | Zellmer | 307/262 |
| 4,047,120 A | 9/1977 | Lord et al. | 330/207 |
| 4,293,904 A * | 10/1981 | Brooks et al. | 363/86 |
| 4,855,891 A | 8/1989 | Paul | 363/56 |
| 6,140,808 A * | 10/2000 | Massie | 323/284 |
| 6,147,526 A * | 11/2000 | Skelton et al. | 327/134 |
| 6,304,066 B1 * | 10/2001 | Wilcox et al. | 323/282 |
| 6,693,782 B1 * | 2/2004 | Lash | 361/93.9 |

OTHER PUBLICATIONS

John Breen, Stacy A. Gower, Brent A. McDonald, Ayedin Nikazm, and Richard M. Tonry Battery Charger Current Limiting Based On AC Power Adapter Power; Filed Feb. 15, 2002; U.S. Ser. No.: 10/077,468; 14 pages of Specification (including Claims & Abstract ); and 5 pages of Figures.

* cited by examiner

Primary Examiner—Ronald Leja

(57) ABSTRACT

A circuit for suppressing transients in a voltage regulator due to a load step transient in the demand of the load. The circuit includes a suppressor element that is placed in the current path of the inductor of the switching regulator in response to a determination of an over voltage condition. The suppressor element pulls the voltage level of one side of the inductor below a particular potential, such as, e.g., system ground. Examples of suppressor elements that may be used include zener diodes, diodes, capacitors, resistors, and negative voltage sources. When the current through the inductor has subsided to a particular level, the suppressor element may be removed from the inductor current path, wherein the energy stored in a bulk filter capacitor may be drained through the inductor to the system ground. The suppressor circuit may be used in a information handling system or other type of electronic system.

29 Claims, 9 Drawing Sheets

SWITCHING REGULATOR TRANSIENT SUPPRESSOR

BACKGROUND OF THE INVENTION

1. Field of the Invention

This invention relates in general to power supplies and more specifically to techniques for load step transient suppression for a power supply.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, and/or communicated, and how quickly and efficiently the information may be processed, stored, and/or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and/or communicate information and may include one or more computer systems, data storage systems, and/or networking systems.

Information handling systems typically include electronic components requiring regulated power for operation. Power supplies for these components may include DC switching regulators for providing power at regulated voltages.

One potential problem for power supplies of information handling systems is that they can be exposed to load step transients, where load demand of the power supply transitions very rapidly from a maximum power demand to low or no power demand. When such a transition occurs, the voltage level of a switching regulator output can rise rapidly due to the energy stored in an inductor of an LC (inductor-capacitor) filter circuit of the switching regulator. If the output voltage level rises too high, it may exceed the voltage tolerances of the components being powered, thereby tripping over voltage protection circuits or in some cases, causing the loss of data or damage to the information handling system.

Techniques for handling load step transients have included operating a switching regulator at a higher switching frequency and increasing the amount of bulk filter capacitance. However, operating a switching regulator at a higher frequency can reduce the power efficiency of the regulator. Increasing the bulk filter capacitance increases the expense and the required board space of a regulator.

What is needed is an improved system for minimizing the effect of a load step transient on a switching regulator.

SUMMARY OF THE INVENTION

It has been discovered that providing a switching regulator with a suppression circuit can advantageously minimize the effect of a load step transient on the switching regulator.

In one aspect of the invention, a switching regulator includes a inductive element having a first end which receives current from a power source. The inductive element has a second end coupled to an output of the regulator. The switching regulator also includes a first switch controlling the supply of current to the inductive element from the power source, a suppressor element, and a first potential at a voltage level. The switching regulator also includes a second switch and a control circuit. The control circuit controls the second switch. In response to a determination of an over voltage condition, the control circuit controlling the second switch to couple the suppressor element to the inductive element for current to flow from the suppressor element to the inductive element whereby the first end of the inductive element is at a voltage level that is less than the voltage level of the first potential.

In another aspect, the present invention includes a method of operating a switching regulator including an inductive element having a first end which receives current from a power source as controlled by a first switch. The inductive element has a second end coupled to an output of the regulator. The method includes detecting an over voltage condition of the switching regulator and in response to the detection, controlling a second switch to enable current to flow through a current path from a first potential to the first end of the inductive element and including a suppressor element whereby the first end of the inductor is at a voltage level that is less than the voltage level of the first potential.

In another aspect of the invention, a direct current buck regulator includes an LC filter having an inductor and a capacitor and a first switch controlling the supply of current to the inductor from a power source. The first switch is coupled to a first end of the inductor. A second end of the inductor is coupled to the capacitor and to an output of the regulator. The regulator also includes a suppressor element, a first potential at a first voltage level, and a second switch. The regulator also includes a control circuit controlling the second switch. In response to a determination to a determination of an over voltage condition of the output, the control circuit controlling the second switch for current flow from the suppressor element to the inductor whereby the first end of the inductor is at a voltage level that is less than the voltage level of the first potential.

BRIEF DESCRIPTION OF THE DRAWINGS

The present invention may be better understood, and it's numerous objects, features, and advantages made apparent to those skilled in the art by referencing the accompanying drawings.

The use of the same reference number or the reference designation throughout the Figures designates a like or similar element.

Figure 1:
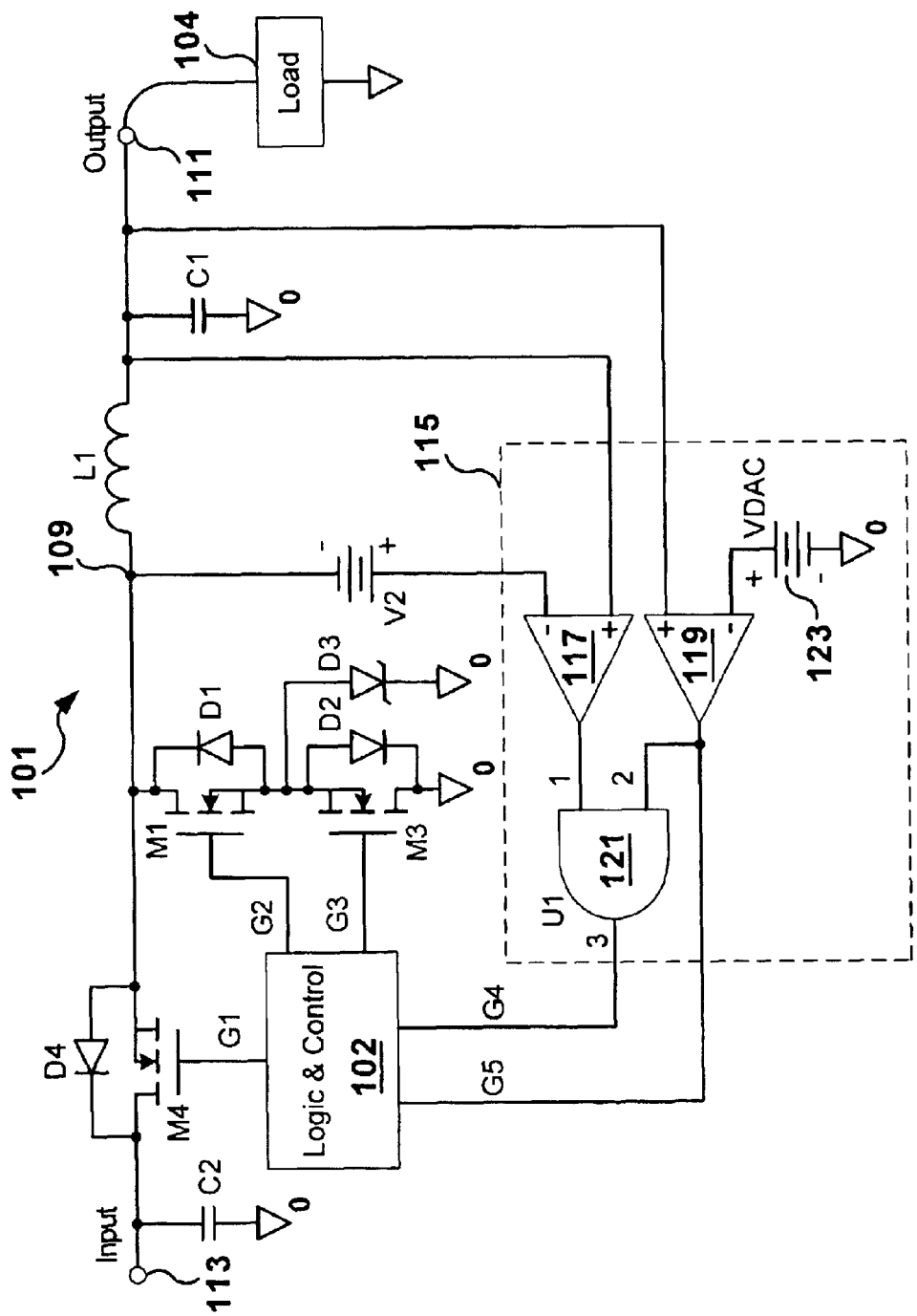
FIG. 1 is a circuit diagram of one example of a switching regulator according to the present invention.

Specific embodiments are shown by way of example in the drawings and will be described herein in detail. It should be understood, however, that the drawings and detailed description are not intended to limit the invention to the particular form disclosed. On the contrary, the intention is to cover all modifications, equivalents, and alternatives falling within the spirit and scope of the present invention as defined by the appended claims.

DETAILED DESCRIPTION

The following sets forth a detailed description of a mode for carrying out the invention. The description is intended to be illustrative of the invention and should not be taken to be limiting.

FIG. 1 is a circuit diagram of one example of a switching regulator according to the present invention. Regulator 101 is a DC to DC, synchronous, buck type, switching regulator having an input 113 coupled to receive current from a DC power source (not shown) such as, e.g., a battery or an AC/DC rectifier. Capacitor C2 is utilized for providing a low impedance at input 113. Regulator 101 includes an output 111 for providing to a load 104, power at a regulated DC voltage. Regulator 101 has an output LC filter circuit that includes inductor L1 and bulk filter capacitor C1. Regulator 101 includes a control circuit 102 that provides switch signals on lines G1, G2, and G3 for controlling the state of switches M4, M1, and M3, respectively. In FIG. 1, switches M4, M1, and M3 are implemented with field effect transistors (FETs), however, those of skill in the art will recognize that based upon the teachings herein, other types of switches may be utilized. In one example, control circuit 102 is implemented with the MAXIM Corp. MAX1718 Integrated Circuit Controller.

In a switching operation, control circuit 102 opens and closes switch M4 at a frequency and at an adjustable duty cycle to provide current to the LC filter circuit. The duty cycle is adjusted to control the voltage level at output 111. Regulator 101 includes a feed back line (not shown) from output 111 to controller 102 for providing an indication of the voltage level of output 111. Regulator 101 includes a second switch M1 that is opened and closed by control circuit 102 at the same frequency but at an inverse duty cycle to the opening and closing of switch M4 during a switching operation.

Regulator 101 includes a transient suppression circuit for reducing the voltage surge at output 111 due to a load step transient where the power requirements of the load 104 change rapidly from a high demand to a low demand. Such a condition may occur when an information handling system changes power states or turns off a high powered device such as a display. When activated, the regulator suppression circuit pulls the voltage level of input side 109 of inductor L1 below system ground by adding an impedance between inductor L1 and system ground. By pulling side 109 below system ground, some of the energy stored in inductor L1 is dissipated in the suppression circuit instead of being dumped into bulk filter capacitor C1.

Figure 3B:
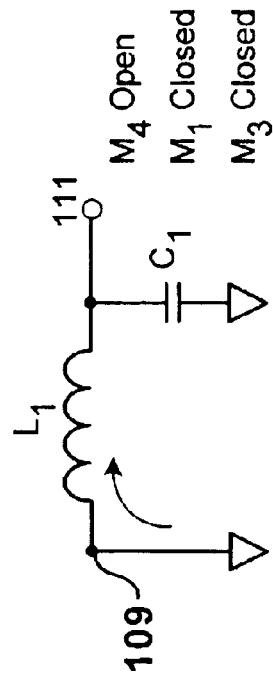
FIGS. 3A–D are current diagrams setting forth current flows through circuits shown in FIG. 1.

With regulator 101, the suppression circuit includes a zener diode D3 with its cathode connected to system ground and its anode connected to switches M1 and M3. In response to an over voltage condition, switches M1 and M3 are opened, and current flows from system ground through zener diode D3 and diode D1 to inductor L1 and into bulk filter capacitor C1. See FIG. 3C. In this manner, energy stored in inductor L1 is dissipated in diode D3, as well as diode D1. The voltage level at side 109 is below system ground by the voltage drop across zener diode D3 and diode D1 or $-(V_{D1}+V_{D3})$. In one example, zener diode D3 is sized such that the voltage drop $V_{D3}$ is significantly greater (e.g., ten times greater) than the voltage drop $V_{D1}$ across diode D1. In another example, zener diode D3 is sized to provide an 5 volt drop.

Regulator 101 includes an over voltage detection circuit 115 for detecting an over voltage condition. Comparator 119 detects when the voltage level of output 111 has exceeded a trip point (as determined by voltage source 123) and provides an indication of such a condition on line G5. Circuit 115 also includes circuitry for providing an indication on signal line G4 of when, in an over voltage condition, the current through inductor L1 (as determined by comparator 117) is in a low level. In such a condition, control circuit 102 deactivates the suppression circuit and shorts inductor side 109 to system ground to rapidly drain bulk filter capacitor C1. See FIG. 3D. Those of skill in the art will appreciate that other implementations of a detection circuit may be utilized. For example, at least some of the circuitry of circuit 115 may be integrated in control circuit 102.

Figure 2:
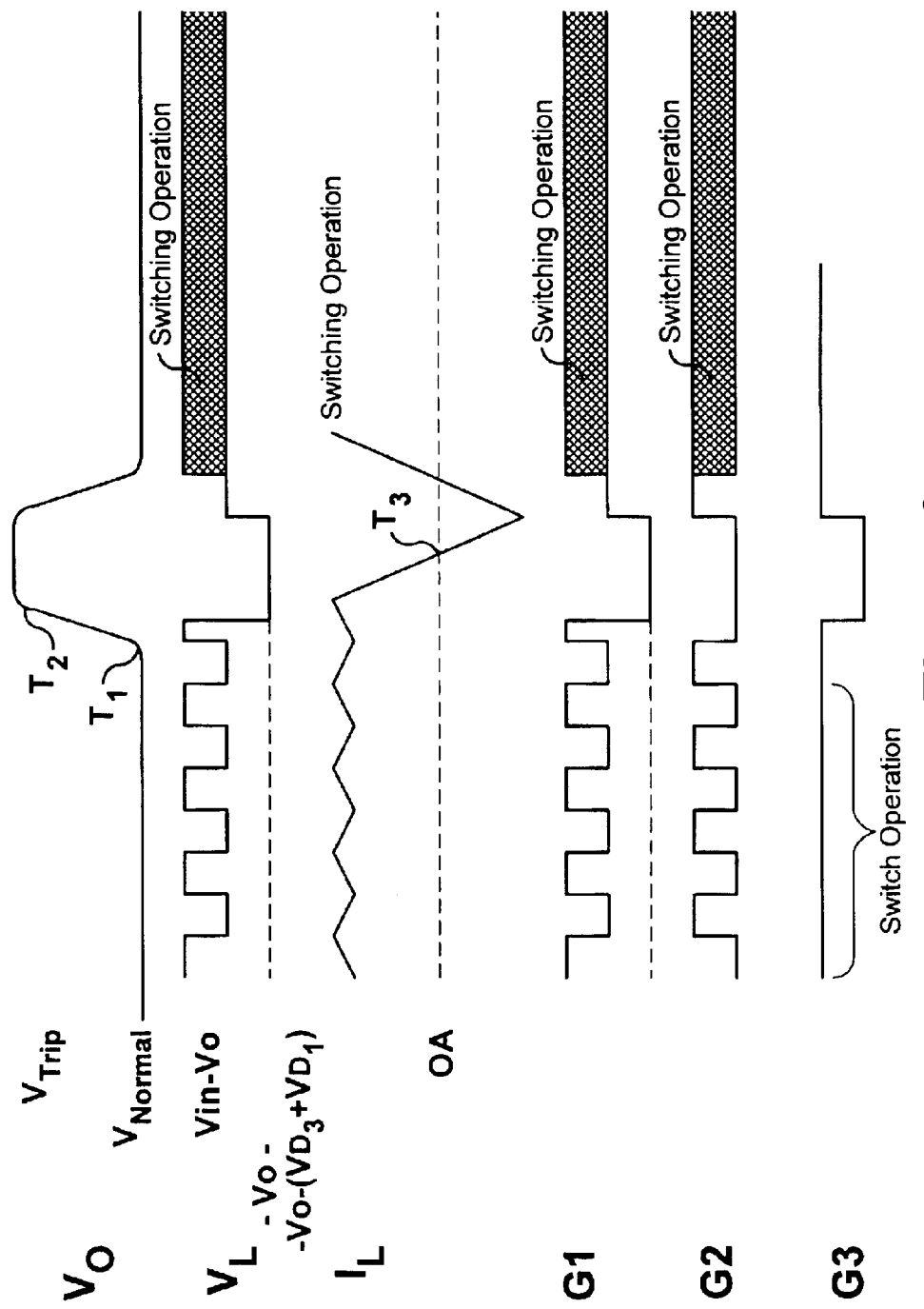
FIG. 2 is one example of a timing diagram illustrating an operation of the switching regulator of FIG. 1.

FIG. 2 is a timing diagram showing an example of an operation of regulator 101 during an activation of the transient suppressor circuit. $V_O$ represents the voltage level of output 111 (FIG. 1). $V_L$ represents the voltage drop across inductor L1. $I_L$ represents the current through inductor L1. G1, G2, and G3 represent the signals provided by controller 102 on signal lines G1, G2, and G3, respectively, for controlling switches M4, M1, and M3 respectively. A high signal on signal lines G1, G2, or G3 closes its respective switch. A low signal on these lines opens its switch.

During a switching operation of regulator 101, controller opens and closes switch M4 (see line G1 of FIG. 2) at frequency and at an adjustable duty cycle for controlling the voltage level of output 111 ($V_O$). At the same time, control circuit 102 opens and closes switch M2 at the same frequency and at a duty cycle (see line G2 of FIG. 2) that is inverse to the duty cycle of the switching signal for switch M1. During this time, switch M3 is closed, thereby shorting out zener diode D3 such that current flows through switch M3 and not through zener diode D3.

FIGS. 3A–3D represent current diagrams of regulator 101 illustrating the flow of current through inductor L1 during the operation of regulator 101. Switches M4, M1, and M3 are not explicitly shown in these Figures, but instead are effectively represented by either a line when closed or with no circuit when open.

Figure 3A:
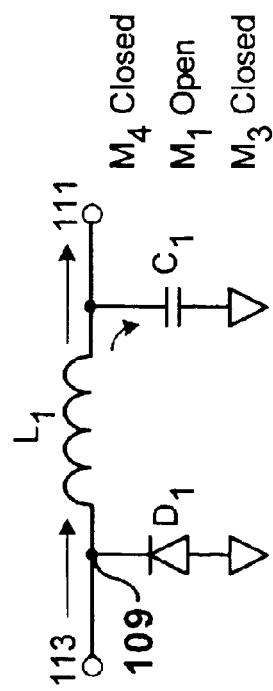
Figures 3C, 3D:
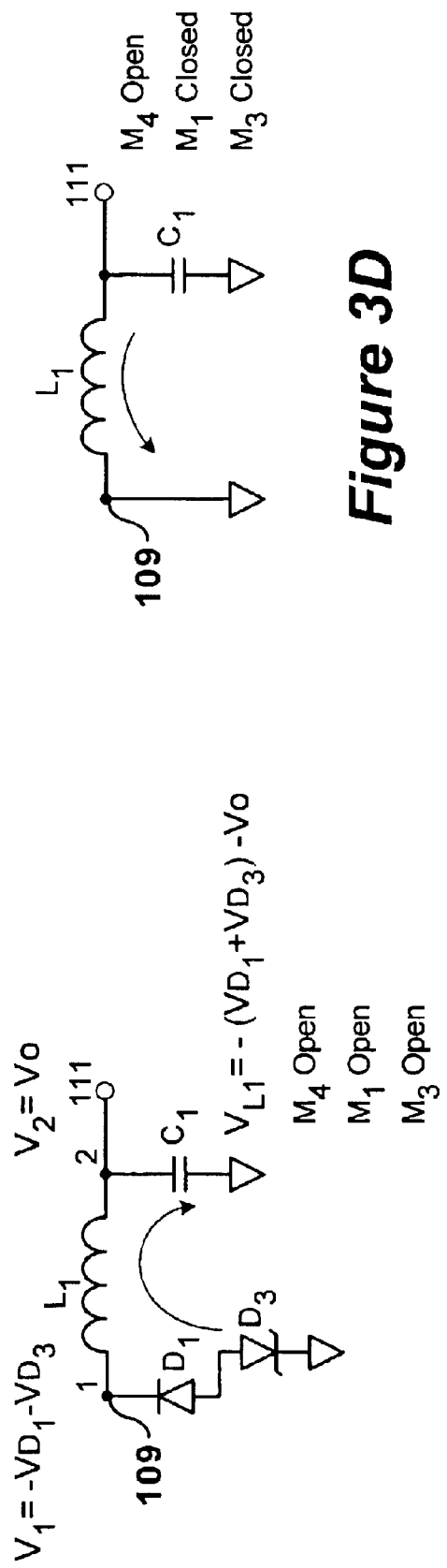

Referring to FIG. 3A, when switch M4 is closed and switch M1 is open during a switching operation, current flows from a DC power source through switch M4 (which is represented a line in FIG. 3A because it is in a closed state) through inductor L1 and out to output 111 and also into capacitor C1. During this time, energy is stored in inductor L1 and capacitor C1. Accordingly, FIG. 2 shows the current ($I_L$) rising in indictor L1 during this time due to the increased energy storage. Because switch M1 is open and switch M3 is closed, the anode end of D1 is shorted to system ground. Diode D1 prevents any current from flowing from system input 113 to system ground in this state.

FIG. 3B shows the circuit during a switching operation when switch M4 is open and switch M1 is closed. Because switch M3 is also closed, side 109 is shorted through switches M1 and M3 to system ground. During this time, current flows from system ground through inductor L1 to output 111, thereby transferring the energy stored in inductor L1. Current may also flow from bulk filter capacitor C1 to output 111. Because switch M4 is open, no current flows from input 113 (thus it is not shown in FIG. 3B). Also, because switch M3 is closed, zener diode D3 is short circuited where no current flows through zener diode D3 (thus it is not shown in FIG. 3B).

During a switching operation, control circuit 102 continuously opens and closes switches M4 and M1 at opposite times to alternately place regulator 101 in the conditions shown in FIGS. 3A and 3B. To control the voltage level at output 111, the duty cycles of M4 and M1 are adjusted accordingly.

Referring back to FIG. 2, when the power requirements of load 104 change rapidly from a high demand to a low demand at time $T_1$, the voltage level $V_O$ at output 111 rises rather rapidly due to the energy stored in inductor L1. At time $T_2$, the voltage level of output 111 exceeds a trip point $V_{trip}$, as determined by comparator 119 (see FIG. 1). In response to such a determination, control circuit 102 opens switches M4, M3, and M1. Opening switch M3 places suppressor element zener diode D3 in a current path that provides current to inductor L1 through diode D1 (due to switch M1 being open). See FIG. 3C. The voltage level at inductor side 109 is less than the voltage level of system ground by the voltage drop across zener diode D3 and diode D1 or $-(V_{D1}+V_{D3})$. In this manner, energy stored in L1 is dissipated in diode D3, as well as diode D1.

Referring back to FIG. 2, as the energy in inductor L1 dissipates the current flowing through inductor L1 decreases as well. At time $T_3$, the current decreases to a particular level, e.g., just above zero amps (0A), as determined by comparator 117. In response to such a determination, control circuit 102 closes switches M3 and M1 to remove zener diode D3 and diode D1 from the current path of inductor L1, thereby shorting inductor side 109 to system ground. See FIG. 3D. Current flows from the capacitor C1, through inductor L1 to system ground. Thus, the energy stored in capacitor C1 can be more rapidly transferred out, thereby bringing the voltage of output 111 back to a normal voltage level. When the voltage of output 111 returns to its normal level or within a particular level from its normal level in some embodiments, regulator 101 returns to its normal switching operation.

Figure 4:
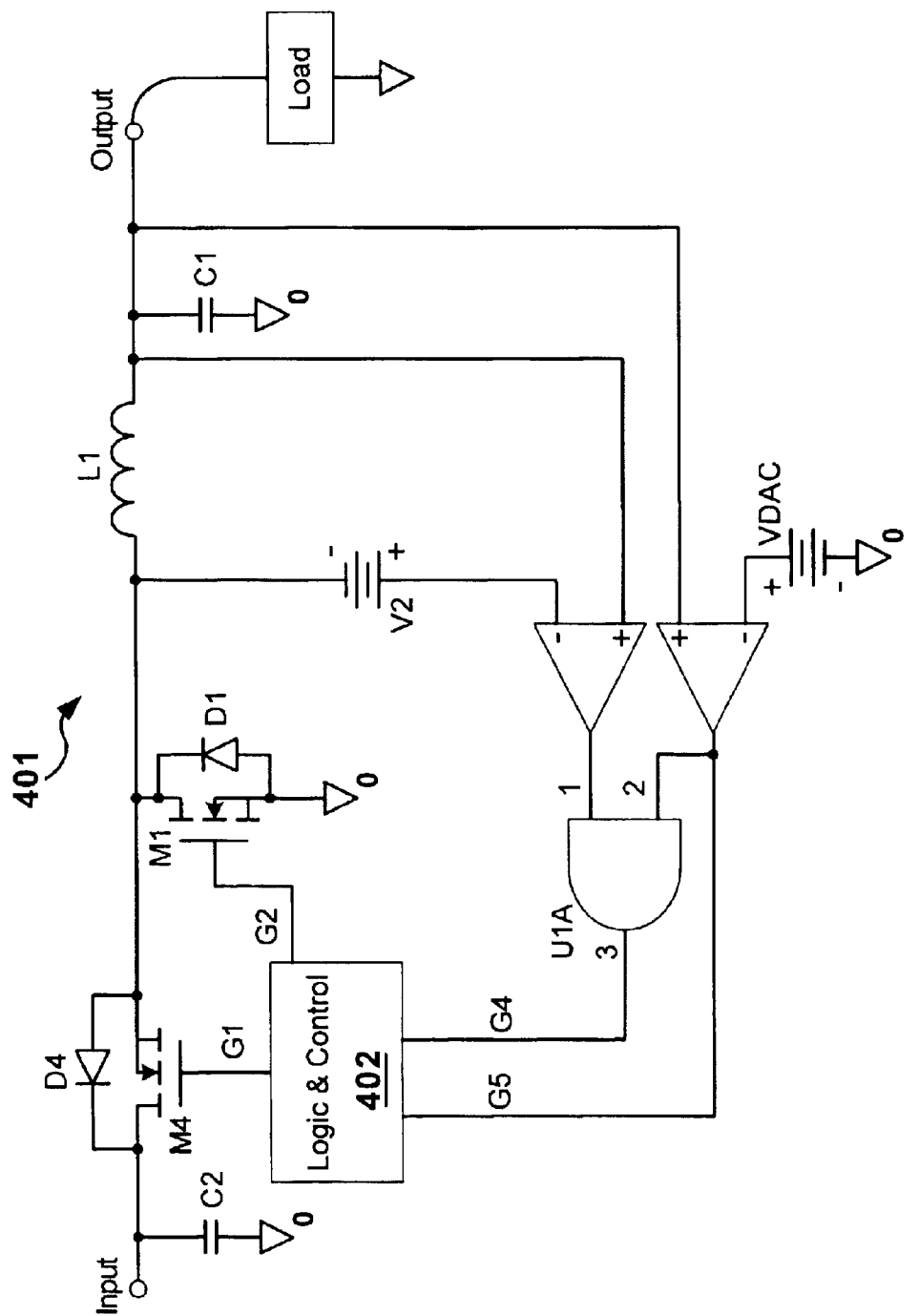
FIG. 4 is a circuit diagram of another example of a switching regulator according to the present invention.

FIG. 4 shows another example of a voltage regulator according to the present invention. Regulator 401 is similar to regulator 101, except that its transient suppression circuit includes only diode D1 as a suppressor element. During a switching operation, switch M1 is always closed when M4 is open, thereby shorting out diode D1. See, for example, FIG. 3B. When M1 is open during a normal switching operation, diode D1 blocks current from flowing through diode D1 to system ground. See, for example, FIG. 3B. In response to an over voltage condition, control circuit 402 opens switches M1 and M4, wherein current flows from system ground, through diode D1 to inductor L1, wherein energy in inductor L1 is dissipated in diode D1, and the inductor side 109 is at a voltage level below system ground by the voltage drop across diode D1.

Figure 5:
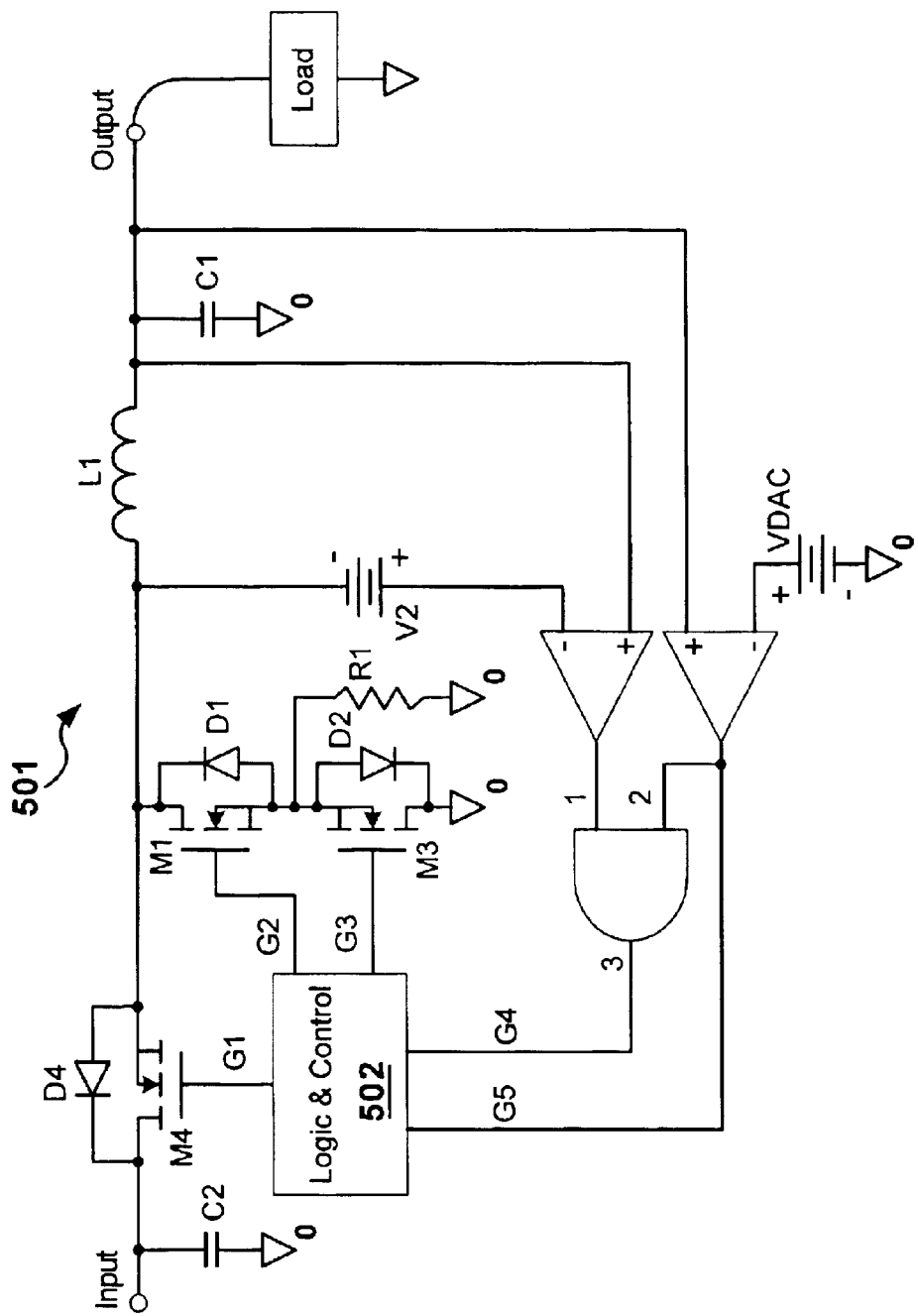
FIG. 5 is a circuit diagram of another example of a switching regulator according to the present invention.

FIG. 5 is a circuit diagram of another example of a regulator according to the present invention. Regulator 501 is similar to regulator 101 except that resistor R1 is used as a suppressor element instead of zener diode D3 (See FIG. 1). In an over voltage condition, switch M3 is opened for current to flow from system ground, through R1 and D1 to inductor L1. The power dissipated in resistor R1 is proportional to the square of the current flowing through inductor L1. Accordingly, power dissipated by resistor R1 declines as the current decreases through resistor R1.

Figure 6:
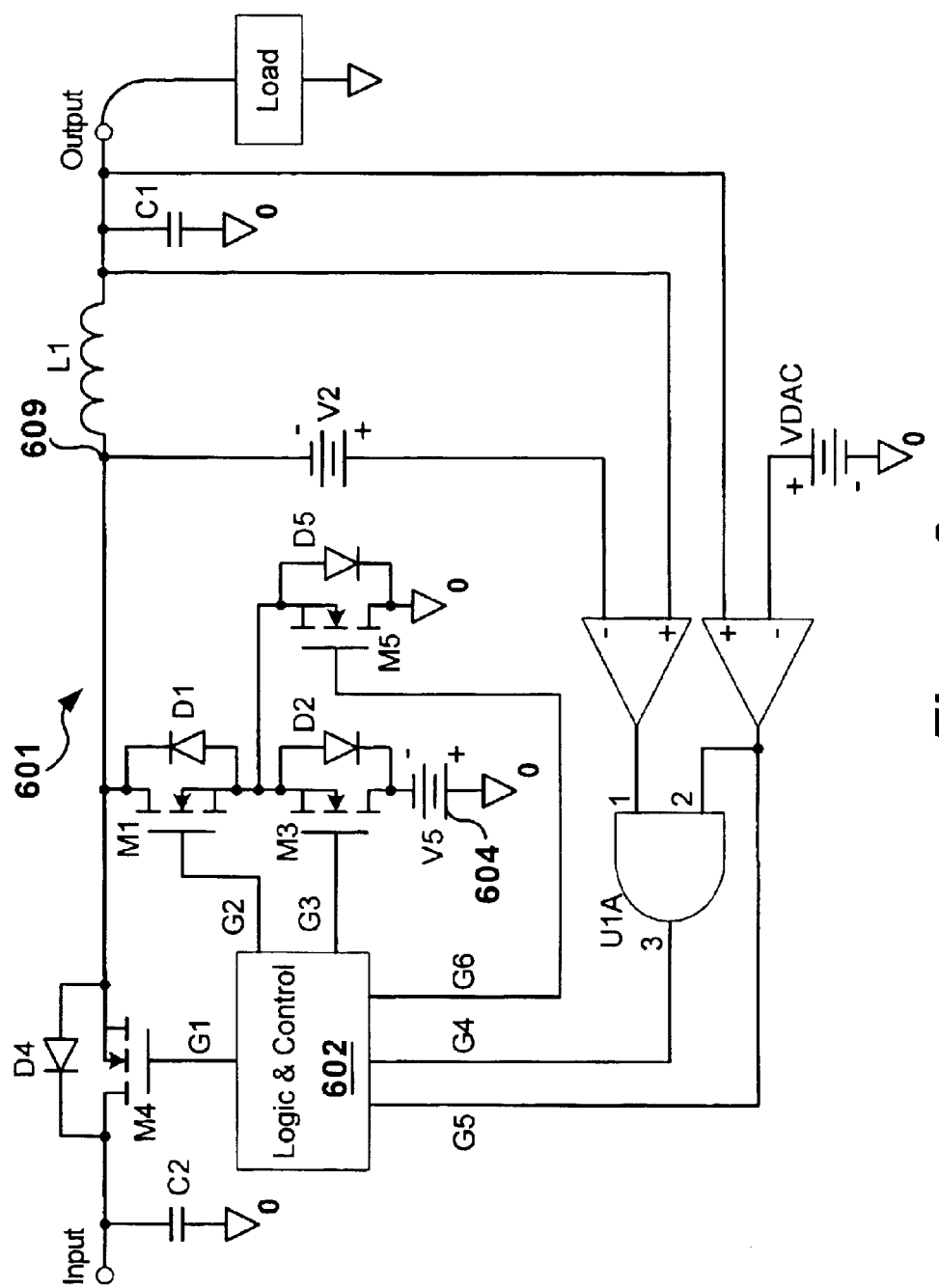
FIG. 6 is a circuit diagram of another example of a switching regulator according to the present invention.

FIG. 6 is another example of a regulator according to the present invention. Regulator 601 includes a negative voltage source 604 as a suppressor element. Voltage source 604 is in series with switch M3. During normal switching operation, switch M3 is always open and switch M5 is always closed to short switch M1 to system ground. In response to an over voltage condition, control circuit 602 closes switch M3 and opens switches M4, M1, and M5, wherein voltage source 604 pulls inductor side 609 below system ground to a voltage level equal to the voltage drop across negative voltage source 604 and diode D1. Negative voltage source may be implemented, in some examples, with charge pumps and other voltage regulators configured in regulator 601 to provide a negative voltage.

In another example of a regulator circuit according to the present invention, regulator 601 as shown in FIG. 6 may be modified to eliminate switch M1 and diode D1. With this modification, diode D2 would be oriented with its anode connected to system ground and its cathode connected to side 609. During a switching operation, switch M5 would be switched on and off at opposite times of switch M4. During an over voltage condition, switch M5 would be opened.

Figure 7:
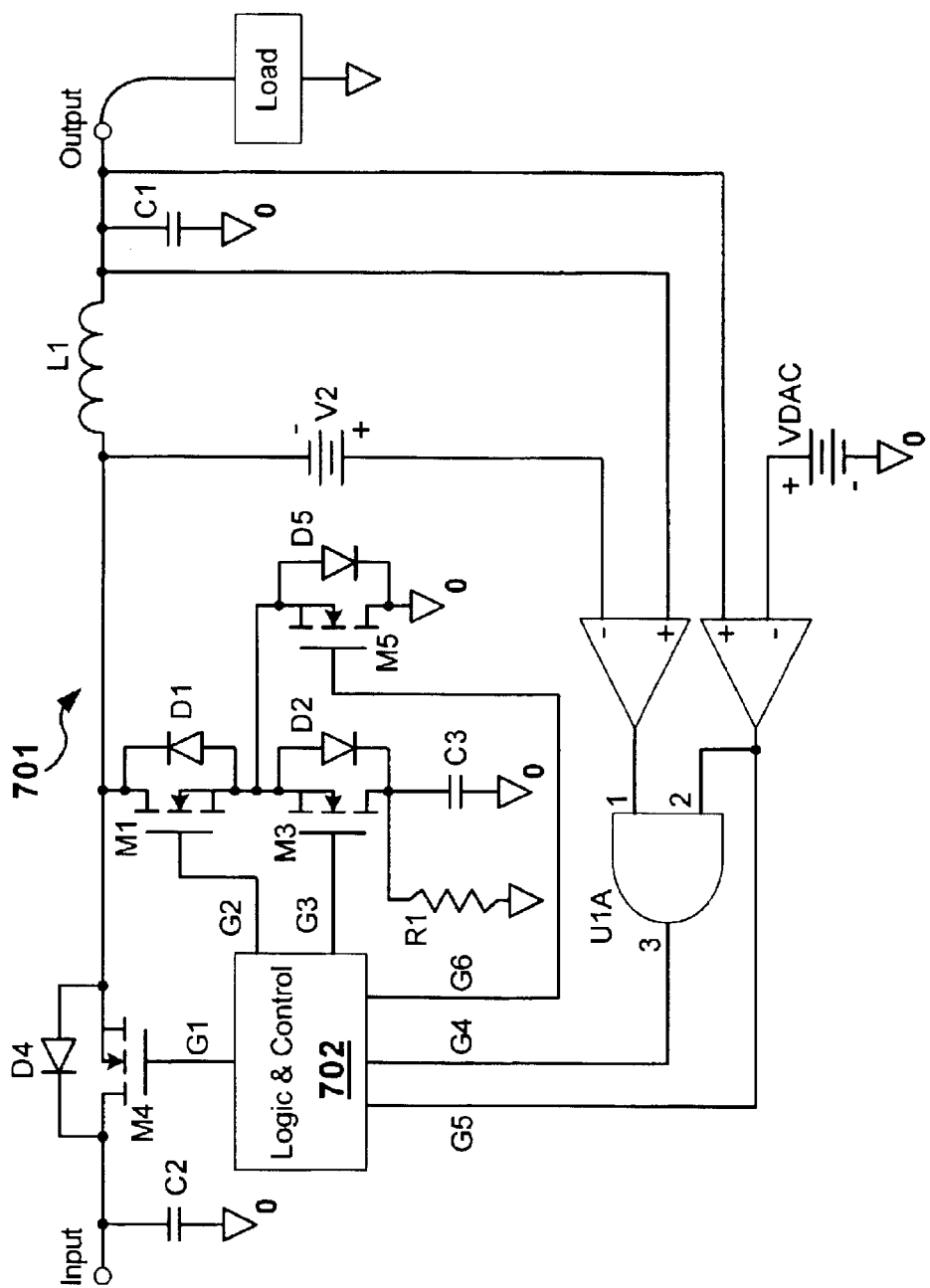
FIG. 7 is a circuit diagram of another example of a switching regulator according to the present invention.

FIG. 7 shows another example of a regulator according to the present invention. Regulator 701 is similar to regulator 601 but instead includes a capacitor C3 as a suppressor element instead of negative voltage source 604. In response to an over voltage condition, switch M3 would be closed and switches M4, M1, and M5 would be opened to allow current to flow from capacitor C1, through diode D1 to inductor L1. When switch M3 is first closed, the initial voltage drop across capacitor C3 would be zero but would increase rapidly as current charges up capacitor C1. Resistor R1 would be utilized for discharging capacitor C3 when switch M3 is opened after an over voltage condition has ceased.

As with regulator 601 of FIG. 6, regulator 701 may be modified to eliminate switch M1 and diode D1. See the discussion above regarding the modifications to regulator 601 of FIG. 6.

Figure 8:
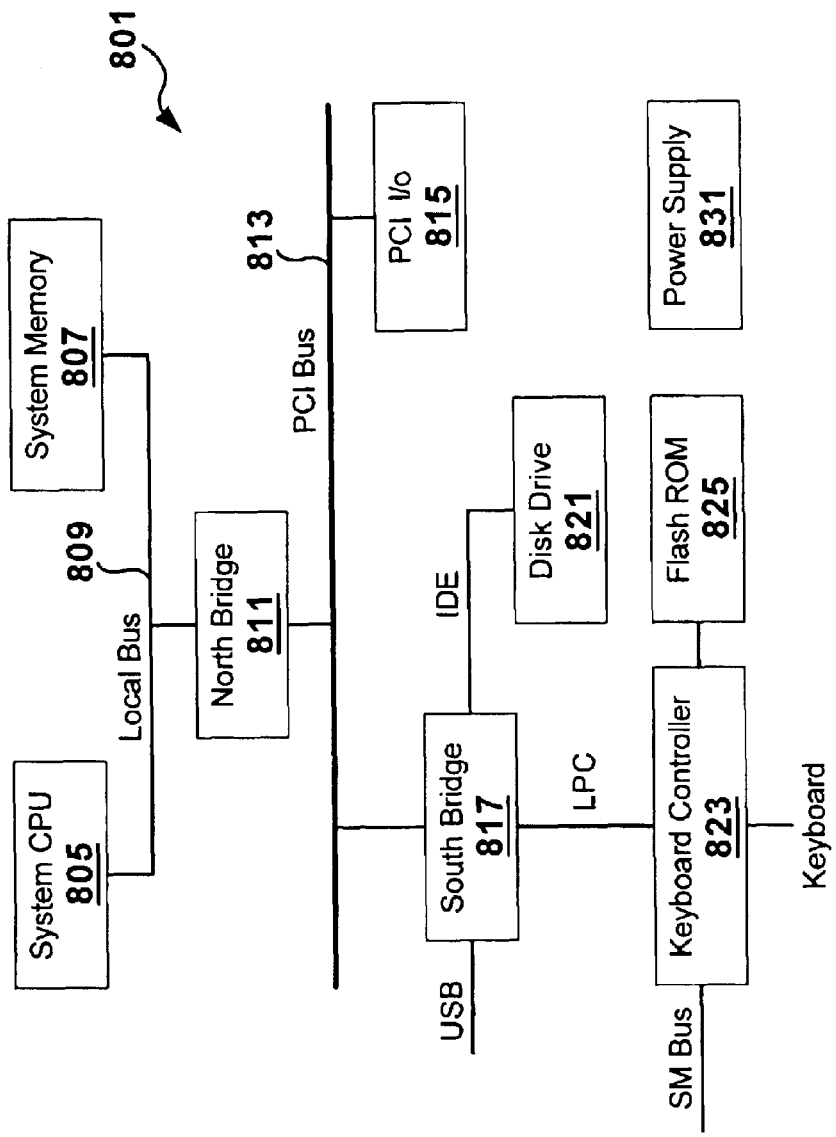
FIG. 8 is an example of a block diagram of an information handling system.

FIG. 8 is a block diagram of one example of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system shown in FIG. 8 is a laptop computer system. One example of a laptop computer system is the LATITUDE C800 sold by the DELL COMPUTER CORP. Computer system 801 includes a system CPU 805 operatively coupled to system memory 807 via local bus 809. In one example, system memory 807 includes multiple DRAM chips mounted on a memory board. System CPU 805 is operably coupled to other components of computer system 801 via a north bridge 811. North bridge 811 is operatively coupled to a south bridge 817 via a PCI bus 813. Other PCI I/O circuits 815 are also located on PCI bus 813. Examples of other PCI I/O circuits include network connection circuits and audio interface circuitry (not shown).

Southbridge 817 includes interface circuitry for other computer busses such as a Universal Serial Bus (USB), an Integrated Drive Electronics (IDE) bus, and a Low Pin Count bus (LPC). A disk drive 821 is located on the IDE bus. Located on the LPC bus, keyboard controller 823 includes circuitry for interfacing with Flash ROM 825 and a keyboard (not shown). Keyboard controller 823 also communicates with environmental management circuits (not shown) over the System Management Bus (SMbus). Computer system 801 may include other conventional components not shown in FIG. 8 such as video graphics circuits, displays, audio components, and CD-ROM drives.

The components shown in FIG. 8 receive operating power from a system power supply 831. The power supply for system 801 includes at least one DC regulator (e.g., regulator 101 of FIG. 1) for providing power at a particular DC voltage. Some systems may include multiple regulators each providing power at a different regulated voltage. With some systems, DC regulators may be distributed throughout the information handling system. In one example, regulator 101 would be used to supply power to the system CPU.

The block diagram of FIG. 8 is just one example of an information handling system in which a power regulator such as those shown in FIGS. 1 and 4–7 may be utilized. Those of skill in the art, based upon the teachings herein, will recognize that regulators described and shown herein may be utilized in other types of information handling systems, such as, e.g., as other types of laptop computer systems, desktop computer systems, or servers.

Those of skill in the art will recognize that, based upon the teachings herein, several modifications may be made to the embodiments shown in FIGS. 1–8 and/or described herein. For example, a regulator according to the present invention may be utilized with any of a number of different types of information handling systems or other types of electronic systems. Furthermore, the suppression circuits shown and described in FIGS. 1 and 4–7 may be implemented in other types of regulators, such as, e.g., non synchronous regulators or regulators having different switching specification may be modified to include features found in other circuits shown or described herein. For example, regulator 101 may be modified such that a switch is placed in series with zener diode D3, similar to that shown in the configuration of FIG. 6, or as modified by the accompanying portion of the specification.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A switching regulator comprising:
   an inductive element having a first end which receives current from a power source, the inductive element having a second end coupled to an output of the regulator;
   a first switch controlling the supply of current to the inductive element from the power source;
   a suppressor element;
   a first potential, the first potential at a voltage level;
   a second switch; and
   a control circuit, the control circuit controlling the second switch, wherein in response to a determination of an over voltage condition, the control circuit controlling the second switch to couple the suppressor element to the inductive element for current to flow from the suppressor element to the inductive element whereby the first end of the inductive element is at a voltage level that is less than the voltage level of the first potential.

2. The regulator of claim 1 wherein the suppressor element further includes:
   a diode having a cathode and an anode, wherein in response to a determination of an over voltage condition, the control circuit couples the diode to the inductive element for current to flow from the cathode of the diode to the inductive element and the first end of the inductor is at a voltage level that is less than the voltage level of the first potential by at least the voltage drop across the diode.

3. The regulator of claim 1 wherein the suppressor element includes a resistor.

4. The regulator of claim 1 wherein the suppressor element includes a zener diode.

5. The regulator of claim 1 wherein the suppressor element includes a capacitor.

6. The regulator of claim 1 wherein the suppressor element includes a negative voltage source.

7. The regulator of claim 1 wherein when the suppressor element is coupled for current to flow from the suppressor element to the inductive element, the first end of the inductive element is at a voltage level that is less than the voltage level of the first potential by at least the voltage drop across the suppressor element.

8. The regulator of claim 1 wherein:
   the second switch is in parallel with the suppressor element, wherein in a closed position, the second switch short circuiting the suppressor element, wherein in response to a determination of an over voltage condition, the control circuit coupling the suppressor element to the inductive element for current to flow further includes placing the second switch in an open position so that current flows from the suppressor element to the inductive element.

9. The regulator of claim 8 wherein during a switching operation of the regulator, the second switch is closed.

10. The regulator of claim 1 wherein:
    the second switch is in series with the suppressor element, wherein in response to a determination of an over voltage condition, the control circuit coupling the suppressor element to the inductive element for current to flow further includes placing the second switch in a closed position so that current flows from the suppressor element to the inductive element.

11. The regulator of claim 10 wherein during a switching operation of the regulator, the second switch is open.

12. The regulator of claim 1 wherein:

in an over voltage condition, in response to a determination that current flow through the inductive element is decreased to a first level, the control circuit places the second switch in a position where no current flows through the suppressor element.

13. The regulator of claim 1 wherein the regulator is a buck regulator.

14. The regulator of claim 13 wherein:

the buck regulator is a synchronous buck regulator;

the buck regulator includes a third switch coupled to the first end of the inductive element; and in a switching operation of the regulator, the control circuit opening and closing the third switch as per a frequency, wherein when closed during a switching operation, the third switch providing at least a portion of a current path for current flow from the first potential to the first inductive element.

15. The regulator of claim 1 further comprising:

a diode in parallel with the third switch, wherein in response to a determination of an over voltage condition, the control circuit placing the third switch in an open position where current flows through the diode to the inductive element.

16. The regulator of claim 1 wherein the suppressor element is located in a current path not utilized for current flow during a switching operation of the regulator.

17. The regulator of claim 1 wherein:

during a switching operation of the regulator, the control circuit opening and closing the first switch at a frequency; and in response to a determination of an over voltage condition, the control circuit placing the first switch in an open position.

18. A method of operating a switching regulator including an inductive element having a first end which receives current from a power source as controlled by a first switch, the inductive element having a second end coupled to an output of the regulator, the method comprising:

detecting an over voltage condition of the switching regulator; and in response to the detection, controlling a second switch to enable current to flow through a current path from a first potential to the first end of the inductive element and including a suppressor element whereby the first end of the inductor is at a voltage level that is less than the voltage level of the first potential.

19. The method of claim 18 wherein the suppressor element includes a diode.

20. The method of claim 18 wherein the suppressor element includes a zener diode.

21. The method of claim 18 wherein the suppressor element includes a resistor.

22. The method of claim 18 wherein the suppressor element includes a capacitor.

23. The method of claim 18 wherein the suppressor element includes a negative voltage source.

24. The method of claim 18 further comprising:

wherein in an over voltage condition and in response to a determination that current flow through the first inductive element has decreased to a specified level, disabling the current flow through the suppressor element.

25. The method of claim 18 wherein the second switch is in parallel with the suppressor element, wherein the second switch is opened to enable current to flow through the current path.

26. The method of claim 18 wherein the second switch is in series with the suppressor element, wherein the second switch is closed to enable current to flow through the current path.

27. The method of claim 18 wherein in response to the detection, the first switch is placed in an open switch state.

28. A direct current buck regulator comprising:

an LC filter including an inductor and a capacitor;

a first switch controlling the supply of current to the inductor from a power source, the first switch coupled to a first end of the inductor, a second end of the inductor coupled to the capacitor and to an output of the regulator;

a suppressor element;

a first potential, the first potential at a first voltage level;

a second switch; and a control circuit, the control circuit controlling the second switch, wherein in response to a determination of an over voltage condition of the output, the control circuit controlling the second switch for current flow from the suppressor element to the inductor whereby the first end of the inductor is at a voltage level that is less than the voltage level of the first potential.

29. An information handling system comprising:

a central processing unit;

memory operably coupled to the central processing unit; and a switching regulator for supplying power to components of the information handling system, the switching regulator including:

an inductive element having a first end which receives current from a power source, the inductive element having a second end coupled to an output of the regulator;

a first switch controlling the supply of current to the inductive element from the power source;

a suppressor element;

a first potential, the first potential at a voltage level;

a second switch; and a control circuit, the control circuit controlling the second switch, wherein in response to a determination of an over voltage condition, the control circuit controlling the second switch to couple the suppressor element to the inductive element for current to flow from the suppressor element to the inductive element whereby the first end of the inductive element is at a voltage level that is less than the voltage level of the first potential.

* * * * *